Nov. 30, 1948.  P. BIBLE  2,454,856
SAFETY COUPLING PIN FOR TRAILER HITCHES
Filed March 13, 1946
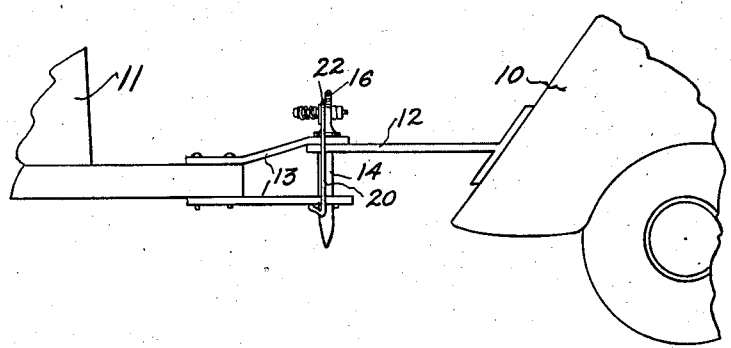
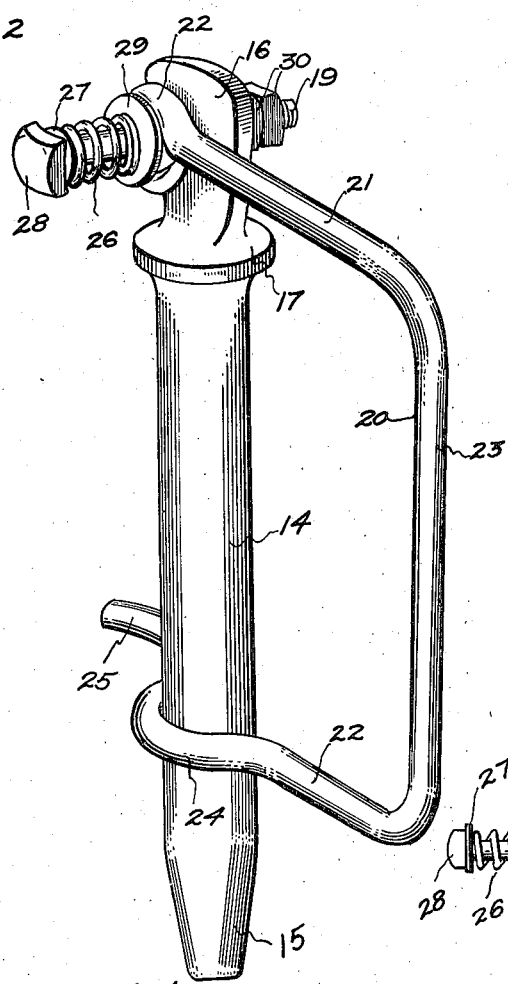
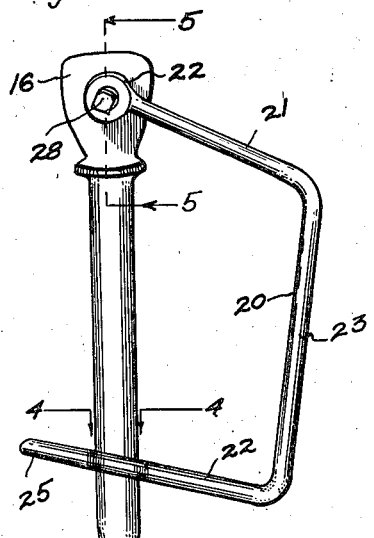
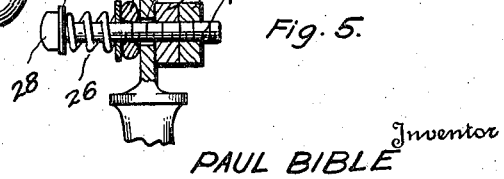
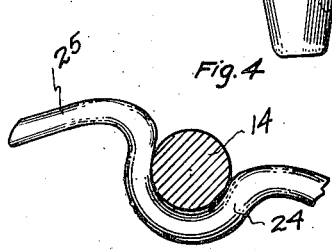
Inventor
PAUL BIBLE Patented Nov. 30, 1948

2,454,856

UNITED STATES PATENT OFFICE 2,454,856

SAFETY COUPLING PIN FOR TRAILER HITCHES

Paul Bible, Hollis, Okla.

Application March 13, 1946, Serial No. 654,087

1 Claim. (Cl. 280—33.15)

This invention relates to a safety coupling pin for trailer hitches and the like, and has for one of its objects the production of a simple and efficient means for automatically locking a pin against accidental removal after the pin has been put in place.

A further object of this invention is the production of a simple and efficient adjustable tension means for the coupling pin and the like, for holding a coupling pin against accidental displacement from a coupling.

Other objects and advantages of this invention will appear throughout the following specification and claim.

In the drawing:

Figure 1 is a side elevational view showing the safety pin in a coupling position;

Figure 2 is a perspective view of the safety pin;

Figure 3 is a rear elevational view;

Figure 4 is a horizontal sectional view taken on line 4—4 of Figure 3;

Figure 5 is a fragmentary vertical sectional view taken on line 5—5 of Figure 3.

By referring to the drawing, it will be seen that 10 designates a power vehicle to which is attached a trailer 11. A coupling element 12 is carried by the power vehicle 10 and a coupling element 13 is carried by the trailer 11 in the conventional manner. These coupling elements 12 and 13 are joined together in the conventional manner by means of a specially constructed safety coupling pin which passes through conventional apertures formed in the elements 12 and 13.

The safety coupling pin comprises an elongated stem 14 which preferably tapers at its lower end, as at 15, to facilitate the passing of the pin through the coupling apertures of the coupling elements 12 and 13. The stem 14 carries a flattened head 16 at its upper end and an annular shoulder 17 just below the head 16 which shoulder 17 is adapted to overlie the coupling member 13 and rest thereon, as shown in Figure 1. The head 16 is provided with a transverse aperture 18 through which aperture a transversely extending threaded bolt 19 protrudes. A keeper or latch element 20 is carried by the bolt 19 and comprises a substantially horizontal upper arm 21 which carries an eye 22 through which the bolt 19 extends. The keeper 20 also comprises a lower substantially horizontal locking arm 22 which is connected to the upper arm 21 by a bridge portion 23. The lower arm 22 is provided with a bowed portion 24 which is adapted to snugly fit around the stem 14 near its lower end thereby defining a pocket. The terminal end 25 of the keeper protrudes laterally of the stem 14, as shown, to provide a handle to facilitate swinging the arm 22 and bowed portion 24 away from and out of engagement with the pin 14, when desired.

A coil spring 26 is carried by one end of the bolt 19 and one end of the spring 26 rests against a suitable washer 27, the washer 27 abutting the head 28 of the bolt 19. The opposite end of the spring 26 abuts the eye 22. This eye 22 rests against the flattened head 16, as shown. Two lock nuts 30 are carried by the outer end of the bolt 19 and are adjustable thereon to regulate the tension of the spring 26 to hold the loop portion 24 of the keeper 20 snugly in engagement with the stem 14 against accidental displacement. The tension of the spring 26 may be adjusted in this way from time to time to at all times hold the keeper 20 in firm contact and in locking position with respect to the stem 20. The loop portion 24 by fitting partly around the stem 14 and fitting snugly therearound will resist lateral strain placed upon the keeper. In this way, a two-fold means is provided to hold the keeper in place. At the same time the structure permits the keeper to be readily released by an operator when it is desired to remove the coupling pin.

From the foregoing description, it will be seen that a very simple and efficient means is provided for locking a coupling pin in place to prevent accidental removal, the parts of the pin being sturdy and easily operated.

It should be understood that certain detail changes in the construction may be employed without departing from the spirit of the invention, so long as such changes fall within the scope of the attached claim.

Having described the invention, what is claimed is:

In a coupling pin, an elongated stem having a flattened head, a threaded bolt extending transversely through said flattened head and protruding therefrom at substantially right-angles, a keeper pivotally connected at one end to said bolt, a coil spring carried by said bolt and engaging said keeper at its point of contact with said bolt, means carried by said bolt for regulating the tension of said spring and to hold the keeper in a locked position against accidental release, the keeper having an elongated bridge portion extending in spaced longitudinal relation to the stem when the keeper is in a locked position, said keeper having a locking arm at one end extending substantially at right-angles to said bridge portion and normally overlying a portion of said stem, said locking arm having a bowed portion adapted to fit snugly around a portion of said stem to lock the bowed portion of the keeper against accidental release from the stem and prevent the swinging of the keeper relative to the stem, said coil spring providing a yieldable means to hold the bowed portion of the keeper snugly positioned around said stem and against accidental release while at the same time facilitating manual release thereof.

PAUL BIBLE.

REFERENCES CITED

The following references are of record in the file of this patent:

UNITED STATES PATENTS

| Number | Name | Date |
| --- | --- | --- |
| 2,367,874 | Kelley | Jan. 23, 1945 |